United States Patent Office 3,214,432
Patented Oct. 26, 1965

3,214,432
N-(SILICO-ALKYL)POLYNITROPIPERIDINES
Milton B. Frankel, Menlo Park, Calif., assignor to Aerojet-General Corporation, Azusa, Calif., a corporation of Ohio
No Drawing. Filed Mar. 9, 1962, Ser. No. 180,398
5 Claims. (Cl. 260—293)

This invention relates to new heterocyclic compounds and to their method of preparation. In particular, the invention relates to N-(silico-alkyl)polynitropiperidines, their preparation, and use.

It is an object of this invention to synthesize new polynitroheterocyclic silanes. A more specific object of this invention is to prepare N-(silico-alkyl)polynitropiperidines which are especially useful in explosives. These and other objects of this invention will appear hereinafter.

The novel N-(silico-alkyl)polynitropiperidines of this invention have the following general formula:

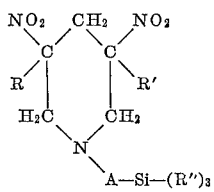

In the above formula R and R' are hydrogen or nitro groups and A is an alkylene radical which may be branched or straight chain. Preferably, A is a lower alkylene radical, i.e., containing from 1 to about 10 carbon atoms such as ethylene, pentamethylene, or decamethylene. R" is a lower alkyl radical which may be branched or straight chain, i.e., methyl, ethyl, neopentyl, octyl, etc. All of the R" groups need not be the same. Thus, for example, one R" group may be ethyl; the second, propyl; and the third, octyl.

The novel N-(silico-alkyl)polynitropiperidines of this invention are prepared by reacting a polynitro-1,5-pentanediol with an N-(silico-alkyl)amine in accordance with the general reaction scheme set forth below:

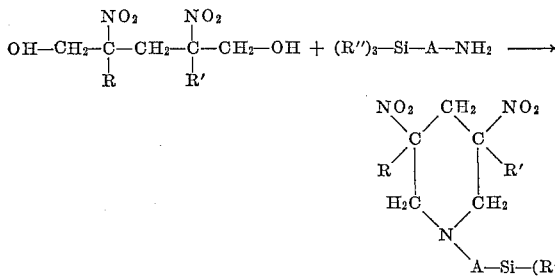

wherein R, R', R", and A are as defined above. In the above reaction the N-(silico-alkyl)amine may be either in the form of the free amine or in the form of the amine hydrohalide salt. The latter is preferred, especially the amine hydrochloride salt, since it is normally more stable.

The reaction is conveniently carried out in any polar solvent in which the reactants are soluble, i.e., water, methanol, ethanol, etc. It is to be understood that when the N-(silico-alkyl)amine reactant is in the form of hydrohalide salt, the solvent is preferably made alkaline by the addition of a base which is more strongly basic than the N-(silico-alkyl)amine and which is capable of converting the amine hydrochloride to the free amine. Typical bases which will liberate the free amine are sodium hydroxide, potassium hydroxide, and lithium hydroxide.

The proportions of the two reactants employed are not critical. Normally, stoichiometrically equivalent amounts are used since this results in the most economical utilization of reactants. The reaction temperature should normally be sufficiently high so that the reactants will dissolve to a substantial degree in the reaction medium but below the decomposition temperature of the polynitro-1,5-pentanediol reactant. Normally the reaction is conducted at a temperature between about 0° C. and about 100° C. The preferred reaction temperature is around 30° C. to 40° C.

Pressure is not critical in this reaction; therefore, while any pressure can be used, the reaction is normally run under atmospheric pressure. Agitation of the reactants, such as by a mechanical stirrer, while desirable in that it increases the reaction rate, is not necessary. The N-(silico-alkyl)polynitropiperidines of this invention are normally solids and may be isolated in conventional manner by filtration, evaporation, and/or crystallization.

To more clearly illustrate my invention, the following example is presented. It is to be understood, however, that this example is intended merely as an illustrative embodiment of the invention and should not be construed as limitative of the scope of said invention in any way. In the example, the percentages are by weight unless otherwise indicated.

EXAMPLE I

Preparation of N-[2,2-dimethyl(2-silico-propyl)]-3,3,5,5-tetranitropiperidine

Into a 100 ml., three-necked flask fitted with a mechanical stirrer and dropping funnel was placed 3.84 g. of 2,2,4,4-tetranitro-1,5-pentanediol and 1.4 g. of N-[2,2-dimethyl(2 - silico - propyl)]amine hydrochloride. [This compound may be prepared by the method shown by Sommer et al., C. A., vol. 47, 483 (1953).] Fifty ml. of water were then added. The reaction mixture was warmed to 35° C. to effect solution. A solution of 0.4 g. of sodium hydroxide in 10 ml. of water was added dropwise' The cream-colored solid which separated was collected by filtration, washed with water, and dried. The yield was 0.6 g. (17.1 percent) and the melting point was 80 to 85° C. Recrystallization from an isopropyl alcohol-water mixture raised the melting point to 88 to 90° C.

Analysis.—Calc'd for $C_9H_{17}N_5O_8Si$: percent C, 30.77; percent H, 4.88; percent N, 19.94; percent Si, 7.99. Found: percent C, 30.84; percent H, 4.69; percent N, 19.97; percent Si, 7.78.

The polynitro-1,5-pentanediol pstarting materials for the reaction of this invention, such as the 2,2,4,4-tetranitro-1,5-pentanediol of the above example, are readily obtained by reacting an alkali metal or alkaline earth metal salt of polynitrobutanol such as potassium 2,2,4,4-tetranitrobutanol with formaldehyde as is more fully disclosed in assignee's copending US. application Serial No. 662,550 now U.S. Patent No. 3,041,382, filed May 29, 1957.

Other N-(silico-alkyl)polynitropiperidines can be prepared by the method of Example I. For example, 2,4- dinitro-1,5-pentanediol and 2,2,4-trinitro-1,5-pentanediol react with N-[(3,3-diethyl(3-silico-pentyl)]amine hydrochloride and N-[4,4-dibutyl(4-silico-octyl)]amine to yield N-[3,3-diethyl(3-silico-pentyl)]-3,5-dinitropiperidine and N-[4,4-dibutyl(4-silico-octyl)] - 3,3,5 - trinitroperidine, respectively.

The N-(silico-alkyl)polynitropiperidines of this invention, which contain a plurality of nitro groups, are inherently useful as high explosives. These compounds can also be used in any conventional explosive missile, projectile, rocket, or the like, as the main explosive charge. An example of such a missile is disclosed in United States Patent 2,470,162, issued May 17, 1949. One way of using these high explosive compounds in a device, such as disclosed in United States Patent 2,470,162, is to pack the crystalline explosive in powder form into the warhead of the missile. Alternatively, the crystals may be first pelletalized and then packed. A charge thus prepared is sufficiently insensitive to withstand the shock entailed in the ejection of a shell from a gun barrel or a rocket launching tube under the pressure developed from ignition of a propellant charge and can be caused to explode on the operation of an impact or time-fuse mechanism firing a detonating explosive such as lead azide or mercury fulminate.

It will be understood that various modifications may be made in this invention without reparting from the spirit thereof or the scope of the appended claims.

I claim:

1. A compound of the formula

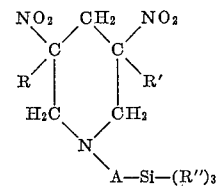

wherein R and R' are selected from the class consisting of hydrogen and nitro, R'' is lower alkyl, and A is lower alkylene.

2. The compound of claim 1 wherein R and R' are both hydrogen.

3. The compound of claim 1 wherein R and R' are both nitro.

4. The compound of claim 1 wherein R is hydrogen and R' is a nitro.

5. The compound N-[2,2-dimethyl(2-silico-propyl)]-3,3,5,5-tetranitropiperidine.

References Cited by the Examiner

UNITED STATES PATENTS 2,978,453  4/61  Frankel _____ 260—293

WALTER A. MODANCE, *Primary Examiner.*

OSCAR R. VERTIZ, *Examiner.*